United States Patent
Wiegraebe et al.

(10) Patent No.: US 6,674,057 B1
(45) Date of Patent: Jan. 6, 2004

(54) OPTICAL NEAR-FIELD MICROSCOPE

(75) Inventors: Winfried Wiegraebe, Jena (DE); Torsten Antrack, Jena (DE); Ralph Lange, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/463,202
(22) PCT Filed: May 19, 1999
(86) PCT No.: PCT/EP99/03425
§ 371 (c)(1), (2), (4) Date: May 4, 2000
(87) PCT Pub. No.: WO99/61949
PCT Pub. Date: Dec. 2, 1999

(30) Foreign Application Priority Data

May 22, 1998 (DE) .......................... 198 22 869

(51) Int. Cl.[7] .............................................. G02B 27/40
(52) U.S. Cl. ..................................... 250/201.3; 250/306
(58) Field of Search .............................. 250/201.3, 306, 250/307

(56) References Cited

U.S. PATENT DOCUMENTS

| | | | | |
|---|---|---|---|---|
| 5,138,159 A | * | 8/1992 | Takase et al. | 250/306 |
| 5,304,795 A | * | 4/1994 | Fujihira et al. | 250/234 |
| 5,333,495 A | * | 8/1994 | Yamaguchi et al. | 73/105 |
| 5,343,460 A | * | 8/1994 | Miyazaki et al. | 369/126 |
| 5,361,314 A | * | 11/1994 | Kopelman et al. | 385/12 |
| 6,229,609 B1 | * | 5/2001 | Muramatsu et al. | 356/601 |

FOREIGN PATENT DOCUMENTS

WO    WO 97/30366    8/1997

OTHER PUBLICATIONS

XP 000518228 / Optical Engineering, Aug. 1994 "Super–resolution imaging and detection of fluorescence from single molecules by scanning near–field optical microscopy" Alfred J. Meixner, et al. (pp. 2324–2332).

XP 00511233 / Review of Scientific Instruments, Jun. 1995 "Design and construction of a versatile scanning near–field optical microscope for fluorescence imaging of single molecules" G. Tarrach, et al. (pp. 3569–3575).

* cited by examiner

*Primary Examiner*—Que T. Le
*Assistant Examiner*—Eric J Spears
(74) *Attorney, Agent, or Firm*—Reed Smith LLP

(57) ABSTRACT

Near-field optical microscope with a probe tip which is arranged on one side of a light-transmitting specimen and moved in a scanning manner. The probe tip serves as a point light source. Optics for collecting light transmitted through the specimen and transmitting it to a detection unit or for collecting illumination light are provided on the other side of the specimen. The movement of the probe tip is adapted to on the detection side, or the probe serves to detect specimen light. A detection unit is arranged following the probe in the direction of illumination, and a scanning illumination adapted to the probe movement is carried out on the other side of the specimen.

10 Claims, 4 Drawing Sheets

OPTICAL NEAR-FIELD MICROSCOPE

BACKGROUND OF THE INVENTION a) Field of the Invention

The invention relates to an improvement in optical near-field microscopes.

b) Description of Related Art

FIG. 1 shows the well-known construction of a SNOM arrangement. A near-field probe shaped as a tip SP is located at a distance of less than the light wavelength above the surface of a transparent specimen P. The specimen is held on a scanning table STI which is movable in the X/Y/z direction, so that the specimen can be scanned linewise by the tip SP. The scanning table STI is controlled by a control unit AE. The light which is not absorbed is collected by an objective O1 and its intensity is measured by a detector DT, for example, an avalanche diode or a PMT, arranged behind a pinhole PH for suppressing scattered light. An image of the surface of the specimen is composed from this. It is further known to reverse the light path and illuminate the specimen through the objective, the transmitted light being collected through the tip SP.

The scanning movement of the specimen results in restrictions in the specimen geometry and in the maximum attainable scanning speed. One reason against a scanning movement of the tip is that the probe and optical construction move relative to one another. Accordingly, it is not possible, for example, to detect the light emitted by the probe confocally or to illuminate confocally the specimen site under examination. The first arrangement is advantageous for suppression of scattered light, the second arrangement prevents bleaching out of dyes in fluorescence measurements. Moreover, it is not possible to stop down larger or smaller apertures (e.g., forbidden light).

OBJECT AND SUMMARY OF THE INVENTION

It is the primary object of the invention to avoid these disadvantages. This object is met by a near-field optical microscope according to the invention, with a probe tip which is arranged on one side of a light transmitting specimen and moved in a scanning manner. The probe tip serves as a point light source, wherein optics for collecting light transmitted through the specimen and transmitting it to a detection unit or for collecting illumination light are provided on the other side of the specimen. The movement of the probe tip is adapted to on the detection side.

Preferred further developments are contained in the dependent claims. The invention will be explained more fully with reference to the schematic drawings.

DESCRIPTION OF THE PREFERRED EMBODIMENTS

Figure 1:
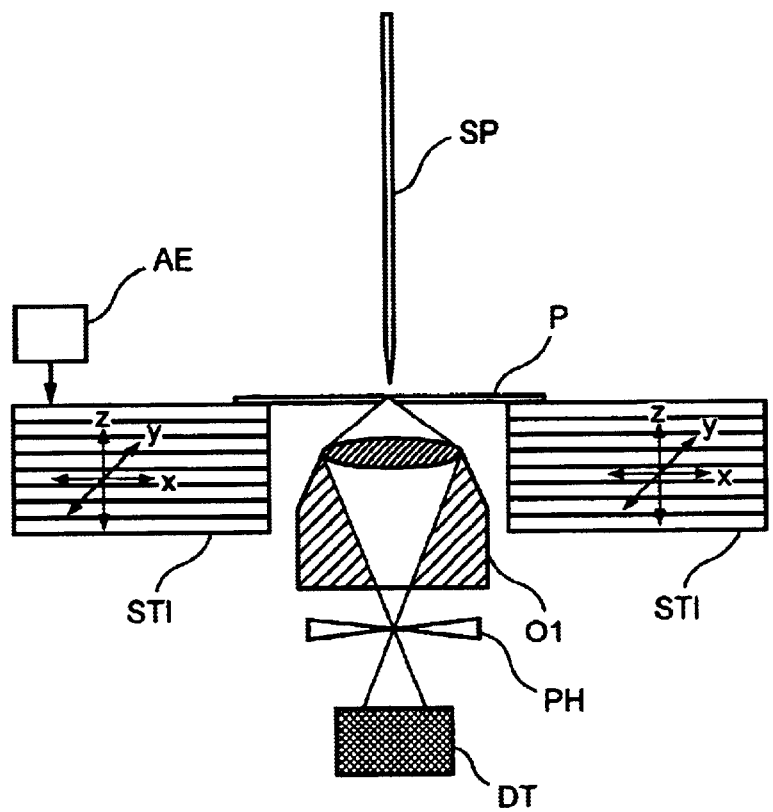
FIG. 1 shows the well-known construction of a SNOM arrangement as described above.
Figure 2:
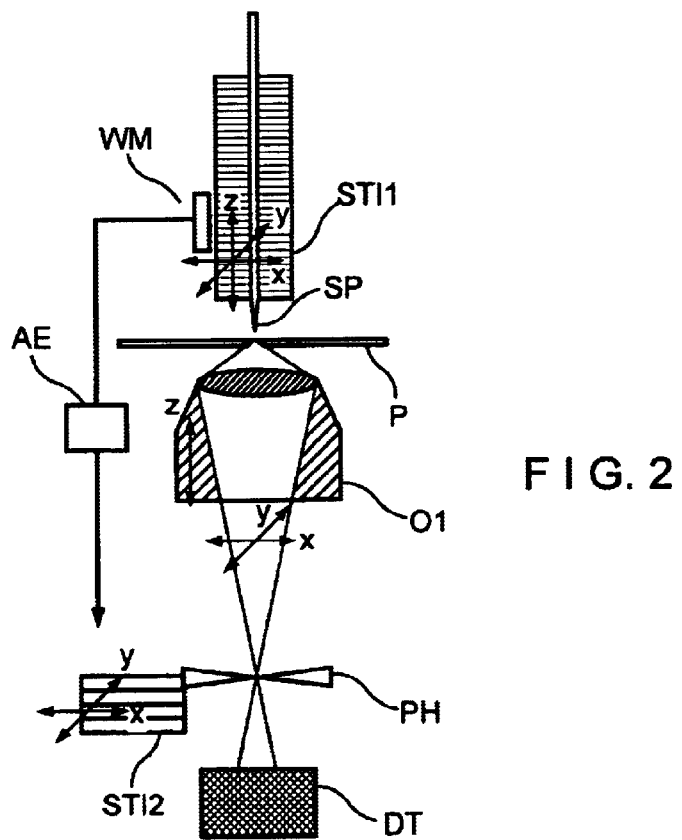
FIG. 2 shows a first optical arrangement with the probe as light source.

FIG. 2 shows an arrangement according to the invention in which the probe SP is mounted in a scanning unit STI1, for example, a piezo scanner, and carries out a scanning movement. The instantaneous position of the probe SP is detected via a path measuring system WM and the pinhole PH is correspondingly tracked by means of a scanning unit STI 2. If the detector DT has a sufficiently large sensitive surface, it need not be moved; otherwise, it can be moved jointly with the pinhole PH by STI2.

The path measuring system WM and the scanning unit STI2 are connected with the control unit AE.

Figure 3:
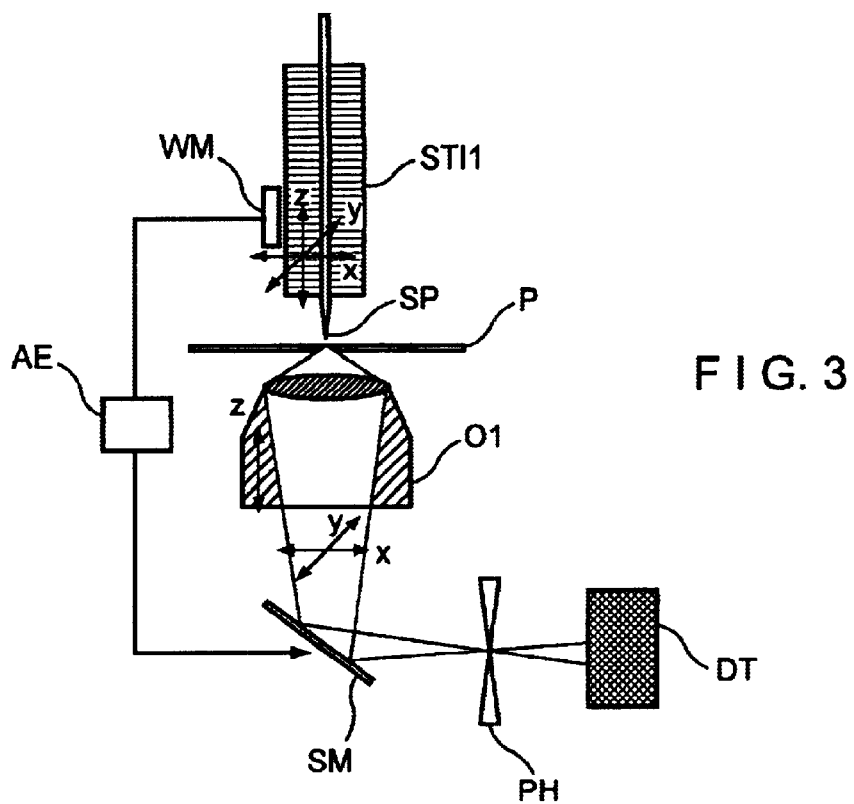
FIG. 3 shows another construction.

In FIG. 3, instead of a tracking of the pinhole PH, the control of a scanning mirror SM arranged downstream of the objective O1 is carried out, this scanning mirror SM being controlled via the control unit AE corresponding to the movement of the tip SP in such a way that the tip of the probe SP is always imaged on the pinhole PH.

The light path can be reversed in the embodiment forms shown in FIGS. 2 and 3. The probe tip is illuminated confocally and the light collected by the probe is supplied to the detector.

Figure 4:
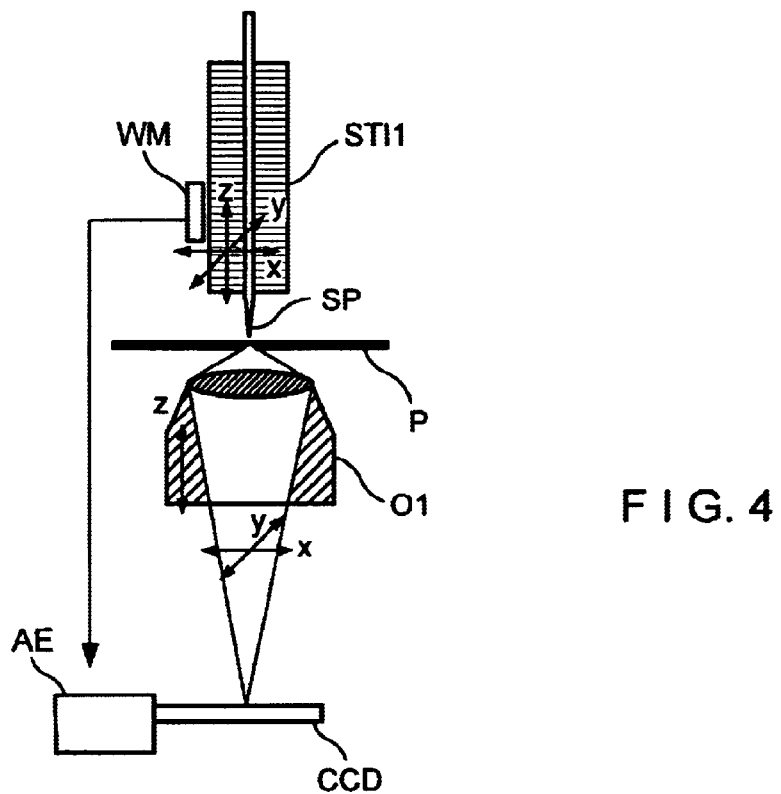
FIG. 4 shows another construction.

The construction realized in FIG. 4 makes do on the detection side without moving parts. The individual pixels of a CCD camera take over the function of the confocal pinhole. The path measuring system WM and control unit AE ensure that only the confocally illuminated pixels are active.

Figure 5:
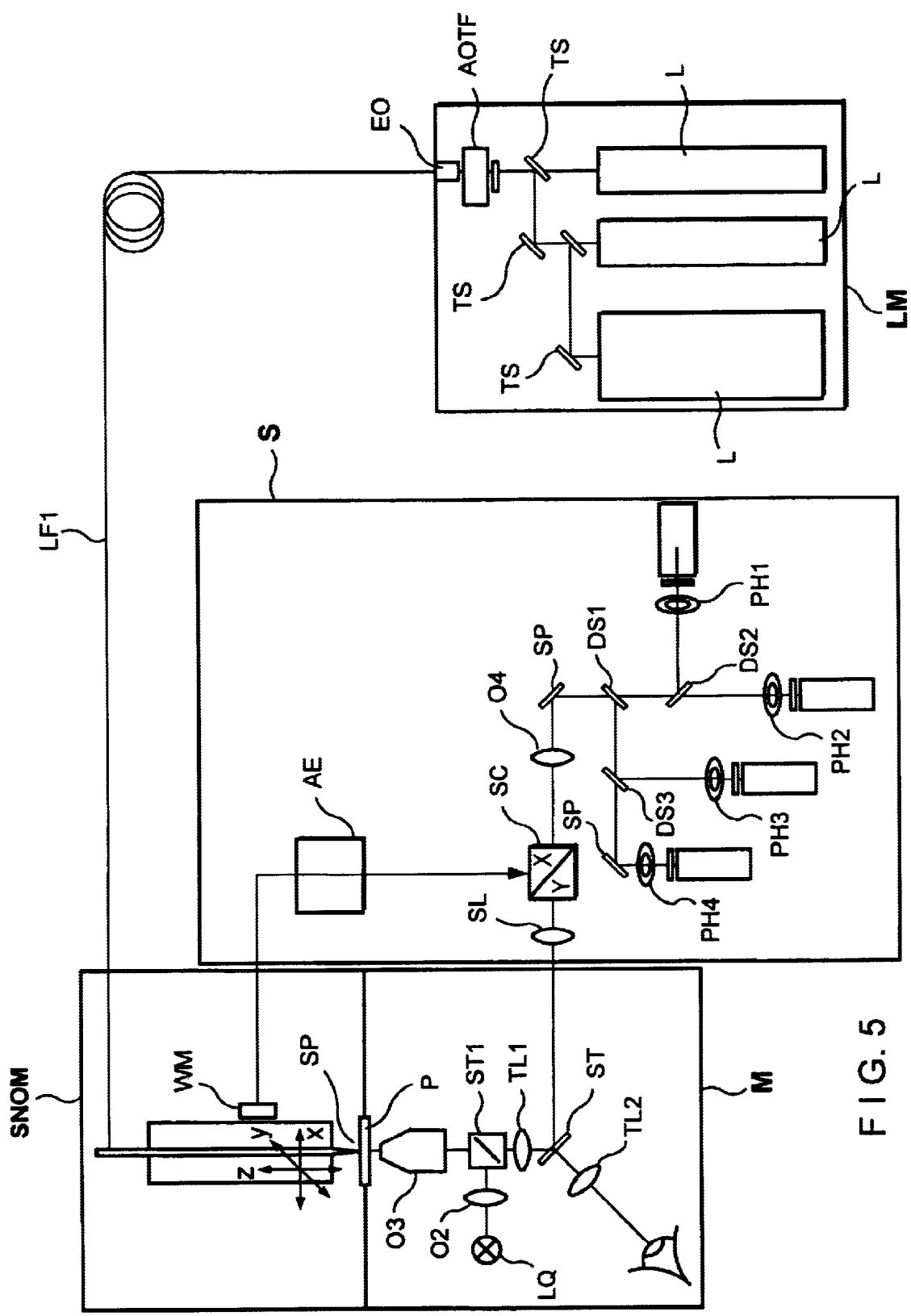
FIG. 5 shows the moving probe tip in an inverse microscope beam path of a laser scanning microscope.
Figure 6:
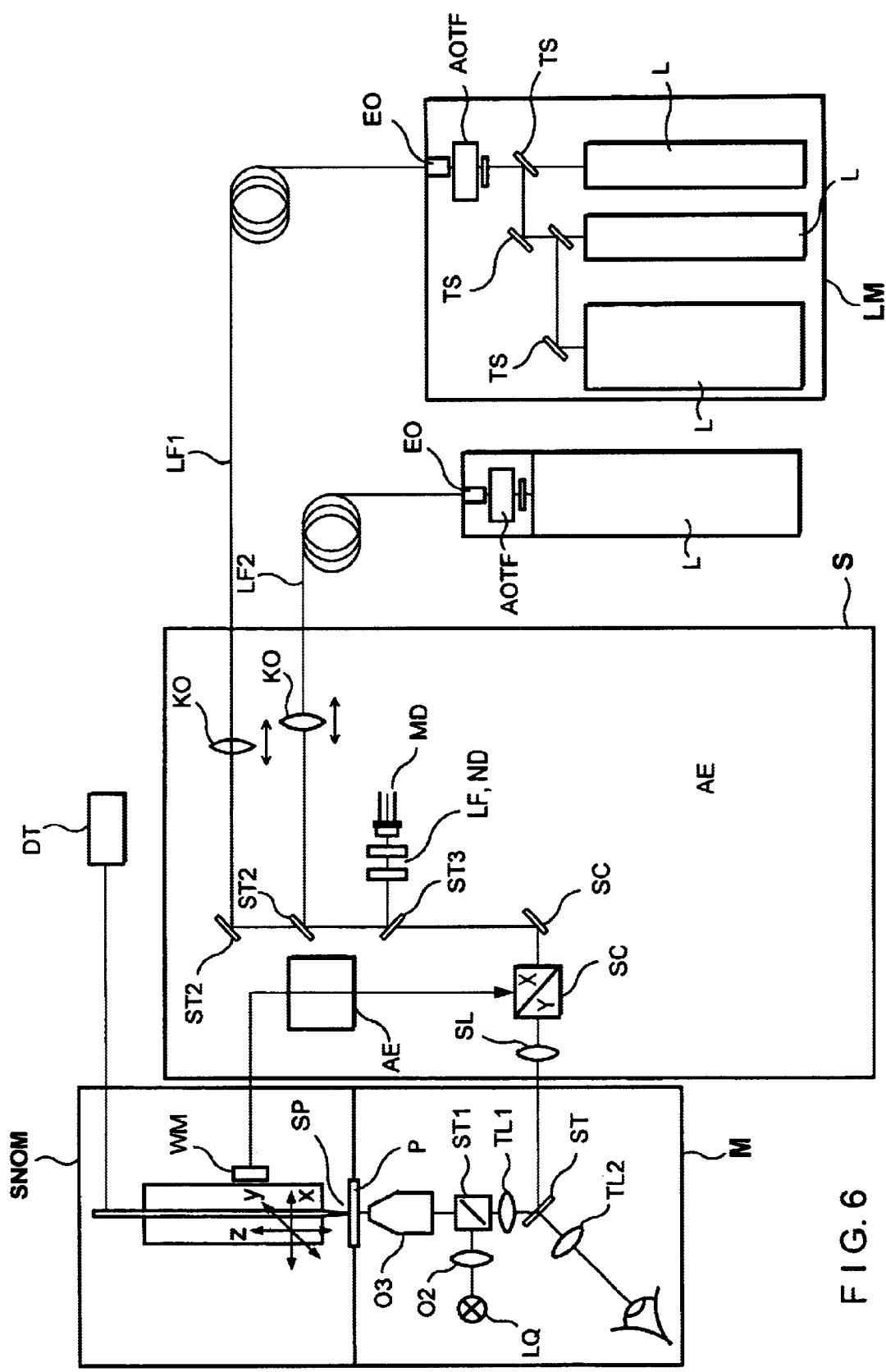
FIG. 6 shows the moving probe tip for detection with an LSM beam path for specimen illumination.

In FIGS. 5 and 6, the near-field optical microscope SNOM is arranged above the object table of an inverse light microscope M. The scanning module S of a confocal laser scanning microscope (LSM), or parts thereof, is located at this light microscope.

A laser module LM contains laser L for illuminating the specimen P via light-conducting fibers LF 1, LF2.

The lasers are combined via splitter mirrors TS and are coupled into the light-conducting fibers LF1,2 via an AOTF and an input-coupling unit EO. The scan head S can be attached to the phototube of an upright microscope as well as to a side output of an inverse microscope M as is shown.

The microscope beam path in the microscope unit M comprises a light source Q, illumination optics O2, beam splitter ST1, objective O3, specimen P and, in the direction of observation/detection, a first tube lens TL1, an observation beam path with a second tube lens TL2 and a beam splitter ST for coupling in and coupling out the scanning beam.

The light from the laser L is coupled into the tip SP of the SNOM in FIG. 5. The actual scanning unit S comprises a scanning objective SL, scanner SC with scanning mirrors, not shown, deflection mirror SP, and shared imaging optics O4 for the detection channels.

The deflection mirror SP arranged following the imaging optics O4 reflects the radiation coming from the specimen P in the direction of dichroic beam splitters DS 1–3 in the convergent beam path of the imaging optics O4, wherein pinholes PH 1–4 which are displaceable in the direction of and perpendicular to the optical axis and which are adjustable in diameter are arranged along with emission filters and suitable receiver elements individually for each detection channel following the beam splitters DS 1–3.

The current position of the tip SP is again determined via the path measuring system WM and is controlled via the control unit AE of the scanning mirror SC of the LSM scanning module S in such a way that the tip SP is imaged on the pinholes PH 1–4.

In FIG. 6, the transmitted light is detected by the tip SP and a detector DT. The illumination or fluorescence excitation is carried out by the confocal illumination beam path of the LSM scan module S.

Coupling into the light-conducting fibers LF1, LF2 is carried out by means of displaceable collimating optics KO and beam deflecting elements ST2.

A monitoring beam path is stopped down by means of a partially transmitting mirror ST3 in the direction of a monitor diode MD, in front of which line filters LF and neutral filters ND are advantageously arranged on a rotatable filter wheel, not shown.

The illumination spot tracks the movement of the tip over STI1 by means of the scanning mirror SC, the path measuring system WM and the control unit AE.

While the foregoing description and drawings represent the present invention, it will be obvious to those skilled in the art that various changes may be made therein without departing from the true spirit and scope of the present invention.

What is claimed is:

1. A near-field optical microscope comprising:
   a probe tip which is arranged on one side of a light-transmitting specimen and moved in a scanning manner, said probe tip serving as a point light source;
   optics for collecting light transmitted through the specimen and transmitting it to a detection unit or for collecting illumination light being provided on the other side of the specimen, wherein the movement of the probe tip is adapted to on the detection side; and
   wherein the probe tip is a point light source and a control unit is provided for synchronizing scanning tracking of a detection unit beam path with the movement of the probe tip;
   wherein a scanning unit is arranged downstream in the detection beam path and images the illumination light on a detector or a pinhole arranged in front of a detector by means of synchronized control;
   and wherein the scanning unit is a scanning mirror of a laser scanning microscope.

2. The near-field optical microscope according to claim 1, wherein a tracked beam path images the probe on the detector confocally.

3. The near-field optical microscope according to claim 1, wherein the detection unit is tracked.

4. The near-field optical microscope according to claim 1, wherein a detector with a pinhole arranged in front of it is tracked.

5. The near-field optical microscope according to claim 1, wherein the detection unit is realized over a surface area and a synchronized tracking of a pinhole arranged in front of the detection unit is carried out.

6. The near-field optical microscope according to claim 1, wherein the probe is imaged on a detector comprising a plurality of elements and the readout of the individual elements is synchronized with the scanning movement of the probe.

7. The near-field optical microscope according to claim 6, wherein the imaging of the probe on the detector includes the use of a CCD camera.

8. The near-field optical microscope according to claim 6, wherein the quantity of simultaneously active elements is only that quantity sufficient to ensure a confocal imaging.

9. The near-field optical microscope according to claim 1, wherein the near-field probe is arranged in the beam path of a microscope on the side opposite to the microscope objective.

10. The near-field optical microscope according to claim 1, wherein the microscope has a lateral coupling in of a scanning beam path.

* * * * *